United States Patent
Galat

(10) Patent No.: US 11,236,781 B2
(45) Date of Patent: Feb. 1, 2022

(54) GREASED BEARING TRACK

(71) Applicant: Caterpillar Inc., Deerfield, IL (US)

(72) Inventor: Michael Stephen Galat, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 515 days.

(21) Appl. No.: 16/020,727

(22) Filed: Jun. 27, 2018

(65) Prior Publication Data

US 2020/0001937 A1    Jan. 2, 2020

(51) Int. Cl.
| | | |
|---|---|---|
| *F16C 33/30* | (2006.01) | |
| *F16C 33/58* | (2006.01) | |
| *F16C 17/02* | (2006.01) | |
| *F16C 43/02* | (2006.01) | |
| *B62D 55/15* | (2006.01) | |

(52) U.S. Cl.
CPC .............. *F16C 33/30* (2013.01); *B62D 55/15* (2013.01); *F16C 17/02* (2013.01); *F16C 33/585* (2013.01); *F16C 43/02* (2013.01); *F16C 2361/71* (2013.01)

(58) Field of Classification Search
CPC .......... F16C 17/02; F16C 17/18; F16C 33/02; F16C 33/046; F16C 33/122; F16C 33/14; F16C 43/02; F16C 2361/71; B60G 2204/418
See application file for complete search history.

(56) References Cited

U.S. PATENT DOCUMENTS

| | | | |
|---|---|---|---|
| 3,700,248 A | * | 10/1972 | Teske ................... F16J 15/3456 277/362 |
| 3,832,022 A | | 8/1974 | Reinsma et al. |
| 4,324,437 A | | 4/1982 | Narang |
| 5,201,171 A | | 4/1993 | Anderton |
| 5,853,233 A | | 12/1998 | Turner |
| 6,071,032 A | | 6/2000 | Link |
| 6,485,116 B1 | | 11/2002 | Oertley |
| 9,227,679 B2 | | 1/2016 | Dumitru et al. |
| 2015/0061373 A1 | | 3/2015 | Steiner et al. |

FOREIGN PATENT DOCUMENTS

| | | | |
|---|---|---|---|
| CN | 202413977 U | | 9/2012 |
| DE | 879496 C | | 6/1953 |
| DE | 10145751 C1 | | 12/2002 |
| JP | 201477522 | * | 5/2014 |
| WO | 2017009875 W | | 1/2017 |

* cited by examiner

*Primary Examiner* — James Pilkington
(74) *Attorney, Agent, or Firm* — Law Office of Kurt J. Fugman LLC

(57) ABSTRACT

A bearing assembly includes a cylindrical configuration with a radial direction, a circumferential direction and defining a bearing assembly longitudinal axis, a first axial end, and a second axial end, an inner radial race, an outer radial race, a bearing member configured to be disposed radially between the inner radial race and the outer radial race, and a retaining ring configured to engage the inner radial race and the outer radial race, the retaining ring being configured to limit longitudinal movement of the inner radial race relative to the outer radial race once assembled.

9 Claims, 8 Drawing Sheets

GREASED BEARING TRACK

TECHNICAL FIELD

The present disclosure relates to a method and apparatus for a greased bearing assembly used in a track chain assembly of an endless undercarriage drive employed by earth moving, construction and mining equipment and the like. Specifically, the present disclosure relates to a sealed grease journal bearing assembly for use with such a track chain assembly.

BACKGROUND

Earth moving, construction and mining equipment and the like are often used in rough, off-road terrain. These machines often employ an endless drive with track shoes that is better able to propel the machines in such environments over obstacles and uneven terrain, etc.

As can be imagined, there can be a great deal of tension and loads on the track chain. As machines become heavier and increase in horsepower, undercarriage link assemblies of the track chain are susceptible to even greater risk of component fatigue and wear. Eventually, the machine and track will need to be serviced, resulting in loss profits.

More specifically, the load exerted on the bushings and track pins of the track chain by the sprocket may cause these components, or the track links, to become worn or fatigued. Or, the seals associated with the bearings and track links for holding lubricant near areas of friction may become damage, allowing the lubricant to leak out. This may lead to wear problems for the moving components of the track chain.

Prior track chains are directed to various performances. For example, U.S. Pat. No. 9,227,679 is commonly owned by the assignee of the present disclosure. The '679 patent is directed to a track pin having an annular exterior surface including a textured region extending less than 360 degrees around the circumference of the exterior surface of the pin. This patent focuses on preventing the track pin in a track chain assembly from walking, not necessarily on preventing component fatigue and wear.

Accordingly, it is desirable that a track chain that is less prone to maintenance be developed.

SUMMARY

A track chain assembly according to an embodiment of the present disclosure may comprise a first track link including a first body defining a top surface, a bottom surface, a first side surface and a second side surface defining a thickness therebetween, a proximate end and a distal end, and a length therebetween. The first body also defines a first bore with a first diameter disposed adjacent the proximate end and a second bore with a second diameter disposed adjacent the distal end, the first diameter being smaller than the second diameter. The assembly further comprises a second track link including a second body defining a top surface, a bottom surface, a first side surface and a second side surface defining a thickness therebetween, a proximate end and a distal end, and a length therebetween. The second body may define a third bore with a third diameter disposed adjacent the proximate end and a fourth bore with a fourth diameter disposed adjacent the distal end, the third diameter being larger than the fourth diameter. The third bore may be aligned with the first bore, defining a common track link bore longitudinal axis. The assembly may further comprise a bearing assembly disposed in the third bore. The bearing assembly may include a cylindrical configuration with a radial direction, a circumferential direction, and defining a bearing assembly longitudinal axis coaxial with the common track link bore longitudinal axis once assembled. The bearing assembly may further define a first axial end, and a second axial end, and may further include an inner radial race, an outer radial race, a bearing member disposed radially between the inner radial race and the outer radial race, and a retaining ring engaging the inner radial race and engaging the outer radial race, the retaining ring being configured to limit longitudinal movement of the inner radial race relative to the outer radial race.

A bearing assembly according to an embodiment of the present disclosure may comprise a cylindrical configuration with a radial direction, a circumferential direction and defining a bearing assembly longitudinal axis, a first axial end, and a second axial end, and including an inner radial race, an outer radial race, a bearing member configured to be disposed radially between the inner radial race and the outer radial race, and a retaining ring configured to engage the inner radial race and the outer radial race, the retaining ring being configured to limit longitudinal movement of the inner radial race relative to the outer radial race once assembled.

A method of assembling a bearing assembly according to an embodiment of the present disclosure may comprise wrapping a split bearing member around an inner radial race, and connecting a retaining ring to one of the inner radial race and the outer radial race.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
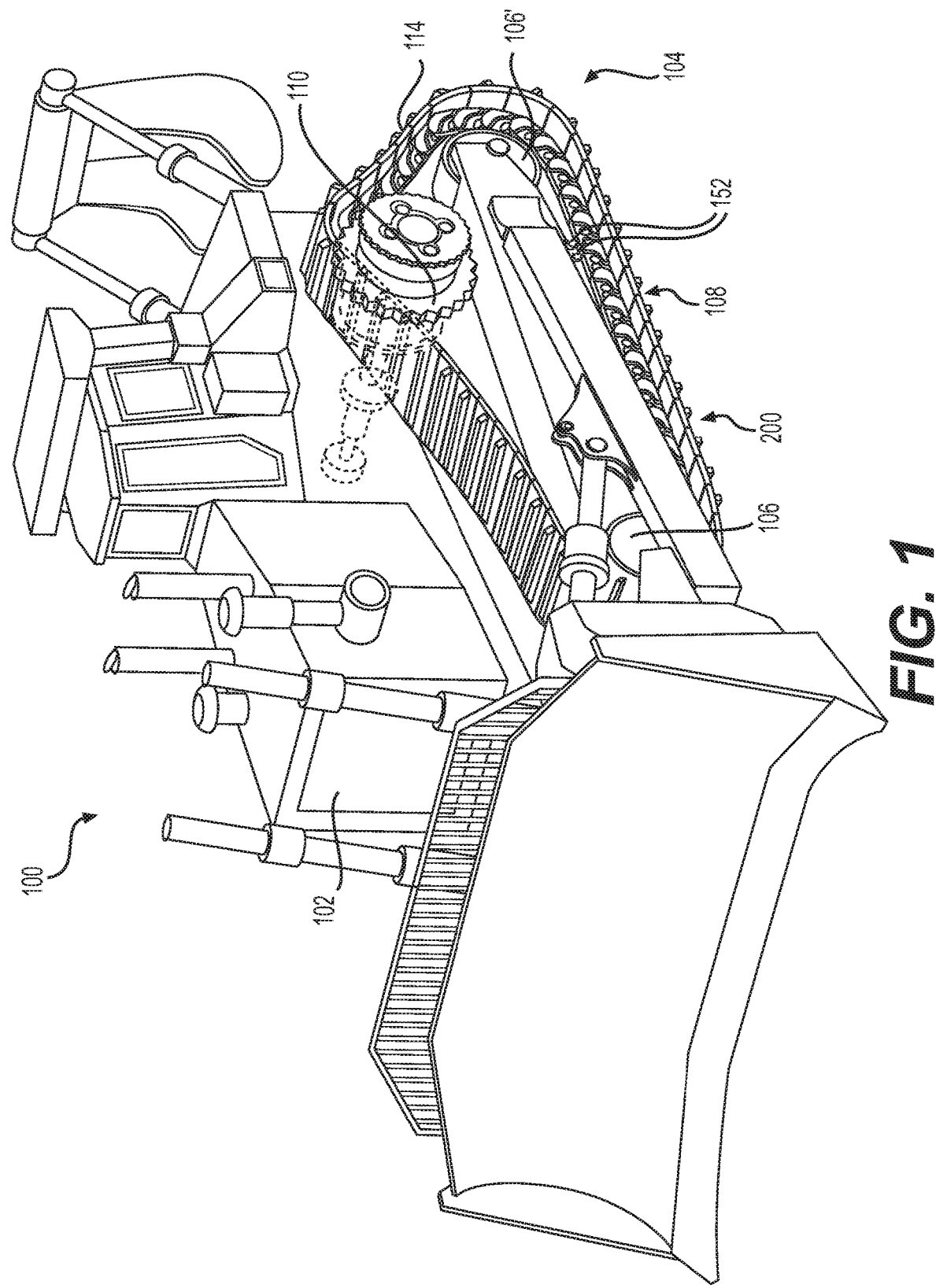
FIG. 1 is a perspective of a machine that may use various track chain assemblies with a bearing assembly according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a track chain assembly and a bearing assembly according will now be described. In some embodiments, a sealed grease journal bearing assembly may be provided. In other embodiments, the pin and bushing are combined into a single component. These various embodiments may reduce the likelihood that the track chain assembly will need to be replaced. That is to say, various track chain assemblies as described herein may be robust.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a track chain assembly 200 and a plurality of track shoes 114, each configured to selectively engage a surface, e.g., the ground. Each track chain assembly 200 may include a plurality of bearing assemblies 300 (not clearly shown in FIG. 1). Support rollers 152 are also provided at the bottom of the track to support the track chain assemblies 300.

Referring now to FIGS. 2 thru 7, a track chain assembly 200 that may use a bearing assembly 300 according to various embodiments of the present disclosure will be described. Starting with FIG. 2, the track chain assembly 200 may comprise a first track link 202 including a first body 204 defining a top surface 206, a bottom surface 208, a first side surface 210 and a second side surface 212 defining a thickness T therebetween, a proximate end 214 and a distal end 216, and a length L therebetween. The first body 204 also defines a first bore 218 with a first diameter 220 disposed adjacent the proximate end 214 and a second bore 222 with a second diameter 224 disposed adjacent the distal end 216. The first diameter 220 may be larger than the second diameter 224 as shown but not necessarily so.

Figure 2:
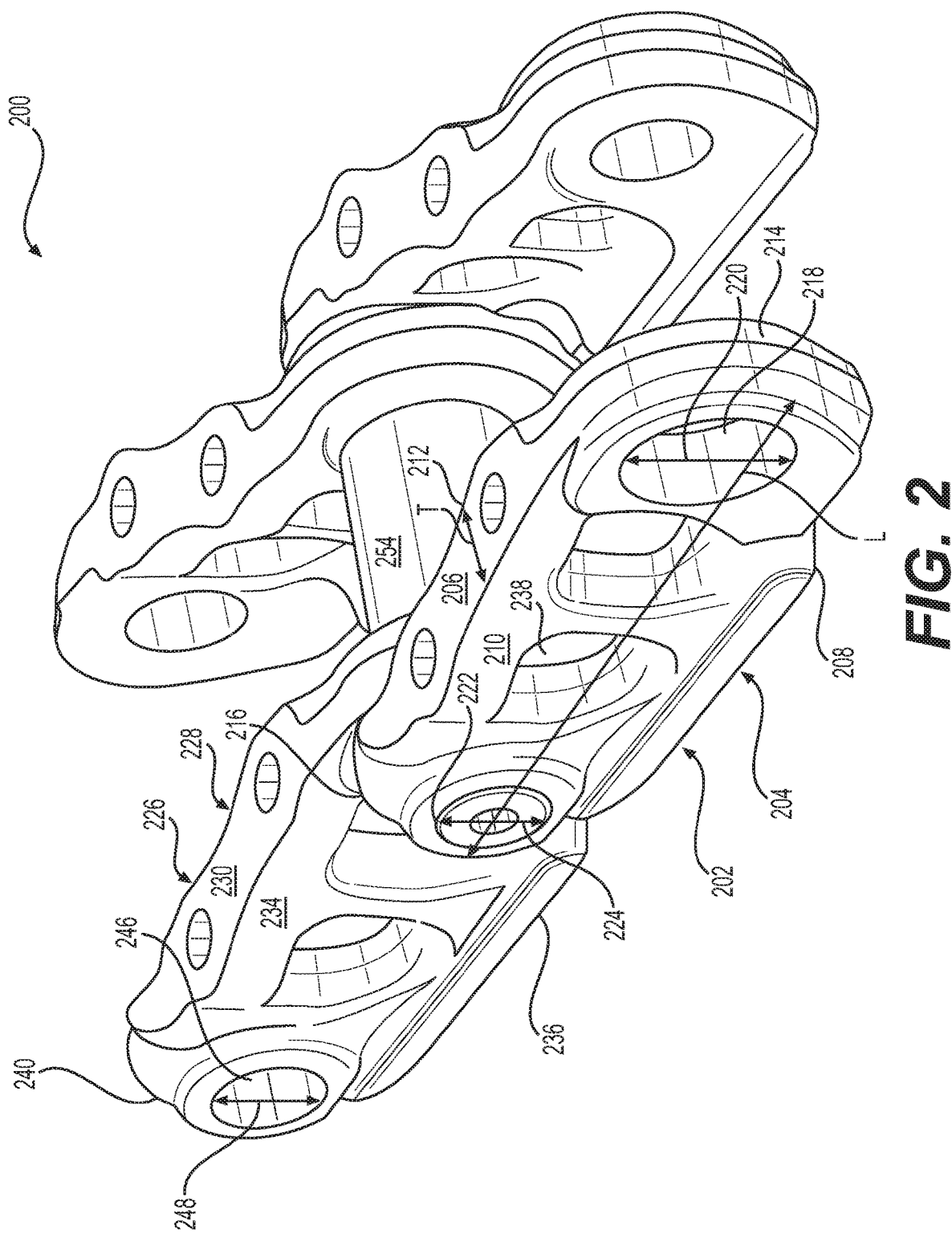
FIG. 2 is a perspective view of a track chain assembly with a bearing assembly according to an embodiment of the present disclosure.
Figure 3:
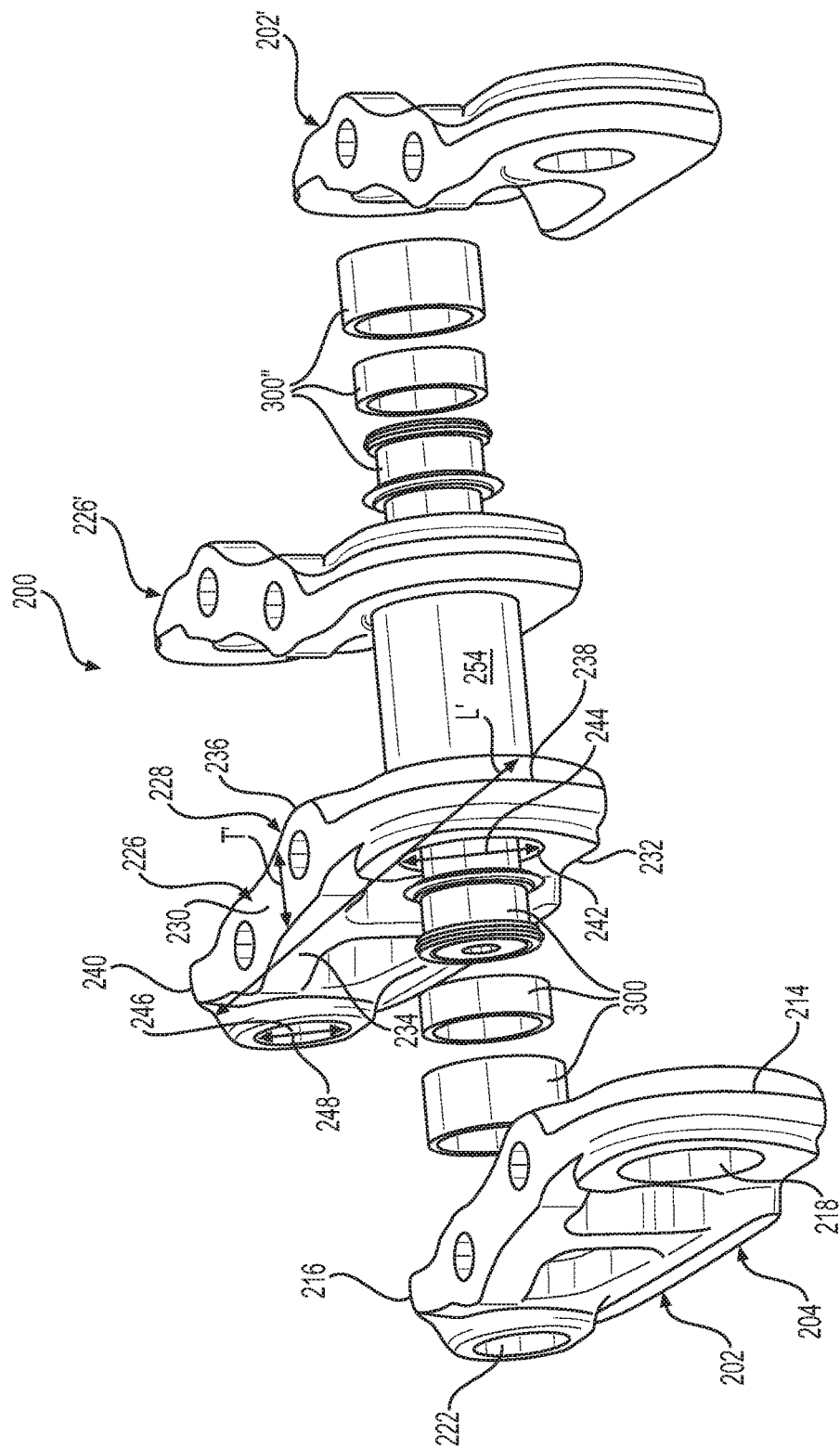
FIG. 3 is an exploded assembly view of the track chain assembly of FIG. 2.

Similarly, referring now to FIGS. 2 and 3, a second track link 226 may be provided including a second body 228 defining a top surface 230, a bottom surface 232, a first side surface 234 and a second side surface 236 defining a thickness T' therebetween, a proximate end 238 and a distal end 240 and a length L' therebetween. The second body 228 defines a third bore 242 with a third diameter 244 disposed adjacent the proximate end 238 and a fourth bore 246 with a fourth diameter 248 disposed adjacent the distal end 240. The third diameter 244 may be larger than the fourth diameter 248 as shown but not necessarily so.

Figure 4:
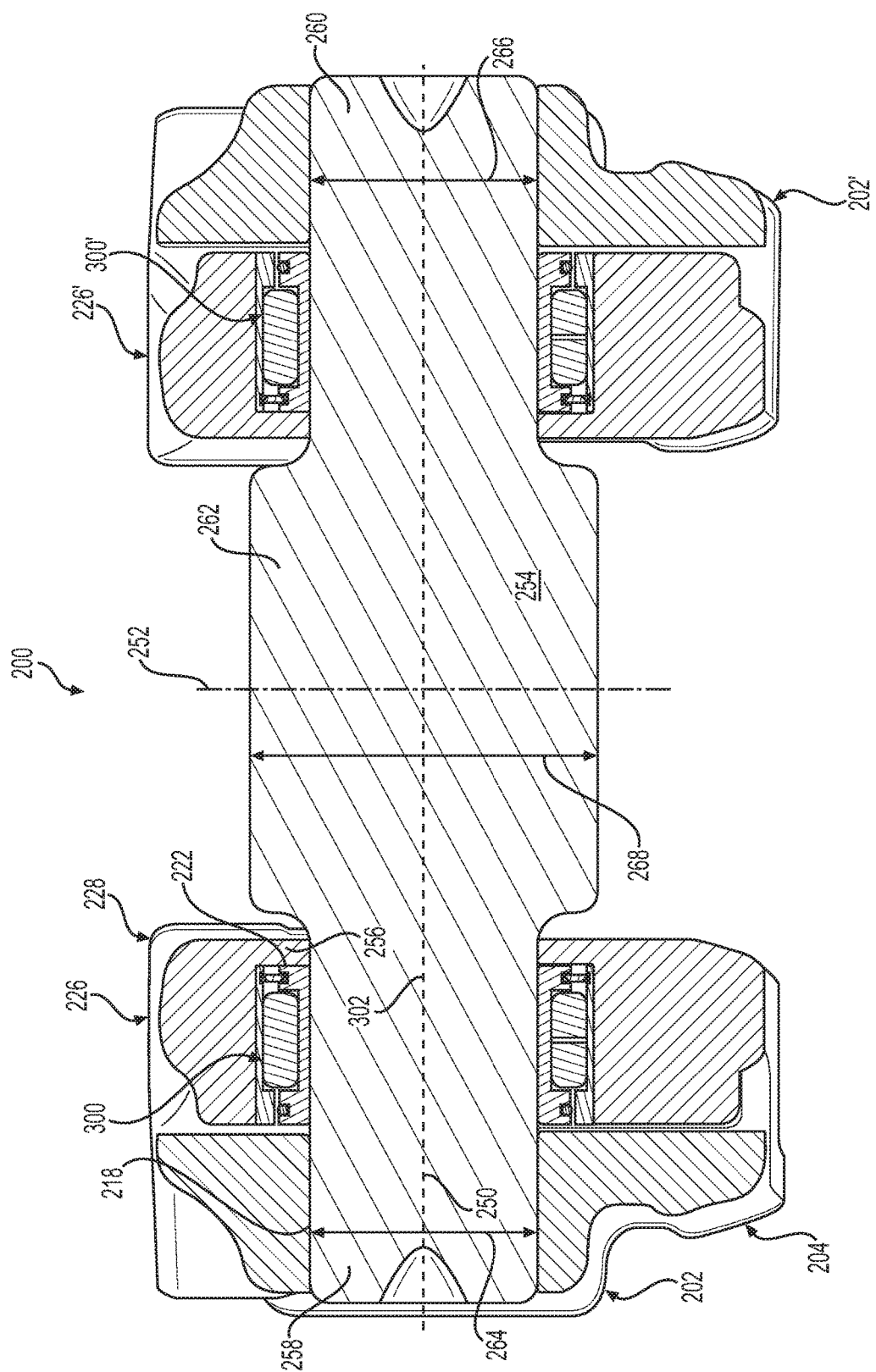
FIG. 4 is a sectional view of the track chain assembly taken a plane containing the longitudinal axis of the track pin and the bearing assembly of FIG. 2.

As best seen in FIG. 4, the third bore 242 is aligned with the second bore 222 when the track chain assembly 200 is assembled. Thus, the first bore 218 and the second bore 222 may define a common track link bore longitudinal axis 250.

As shown in FIGS. 2 thru 4, the first track link 202 and the second track link 226 may be similarly or identically configured but not necessarily so. Also, the first track link 202 and the second track link 228 are shown to be offset links since their bodies 204, 228 jog axially. In other embodiments, the first and second track links 202, 226 may be straight links, etc. As best seen in FIG. 4, the track chain assembly 200 may define a plane of symmetry 252 at the midpoint of the axial length of the track pin 254. Thus, a second set of another first track link 202', another second track link 226', and another bearing assembly 300' is provided. This may not be the case in other embodiments.

Focusing on FIGS. 3 thru 6, a bearing assembly 300 may be disposed in the third bore 242. Looking at FIG. 5, the bearing assembly 300 may include an annular cylindrical configuration with a radial direction R, a circumferential direction C, and defining a bearing assembly longitudinal axis 302 that is coaxial with the common track link bore longitudinal axis 250 (as seen in FIG. 4).

Figure 5:
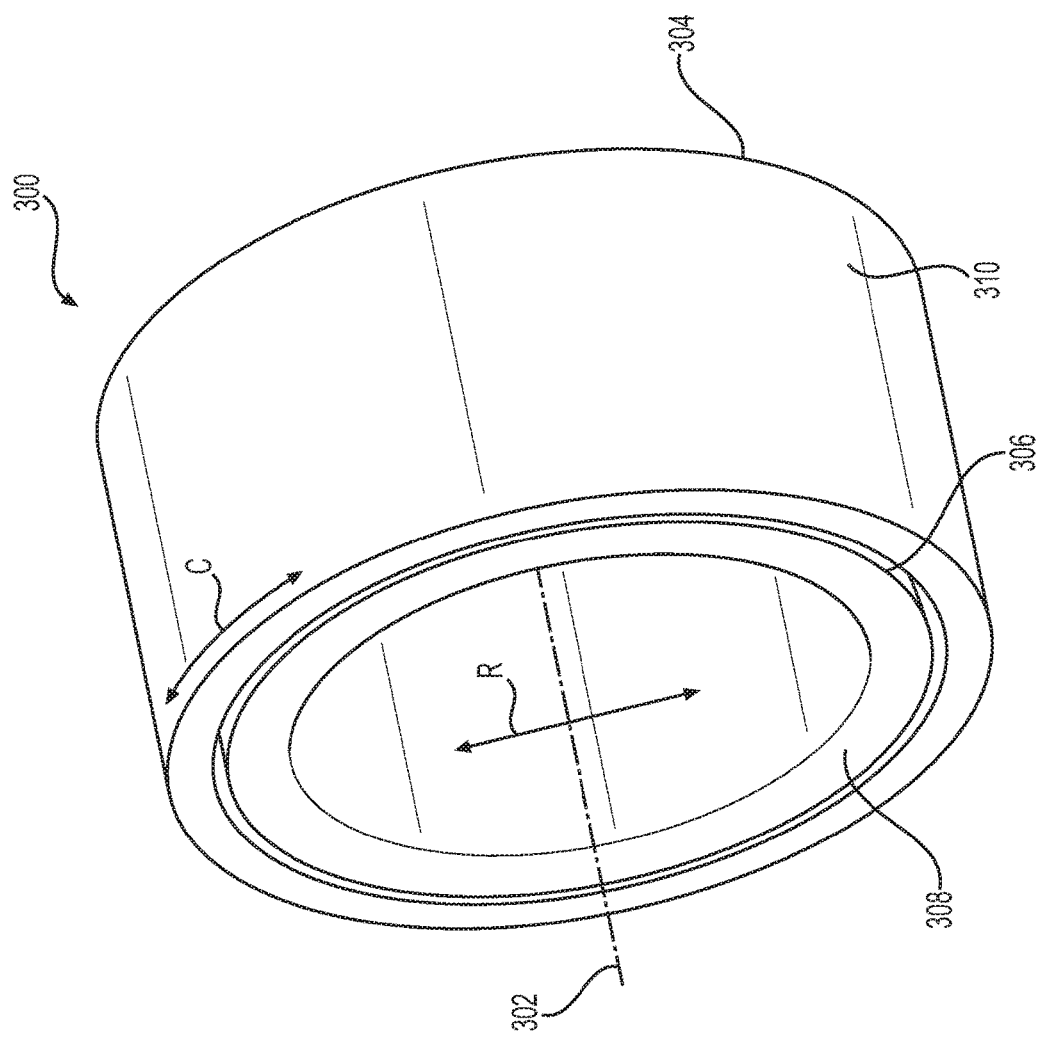
FIG. 5 is a perspective view of the bearing assembly of FIGS. 3 and 4 shown in isolation from the track chain assembly.
Figure 6:
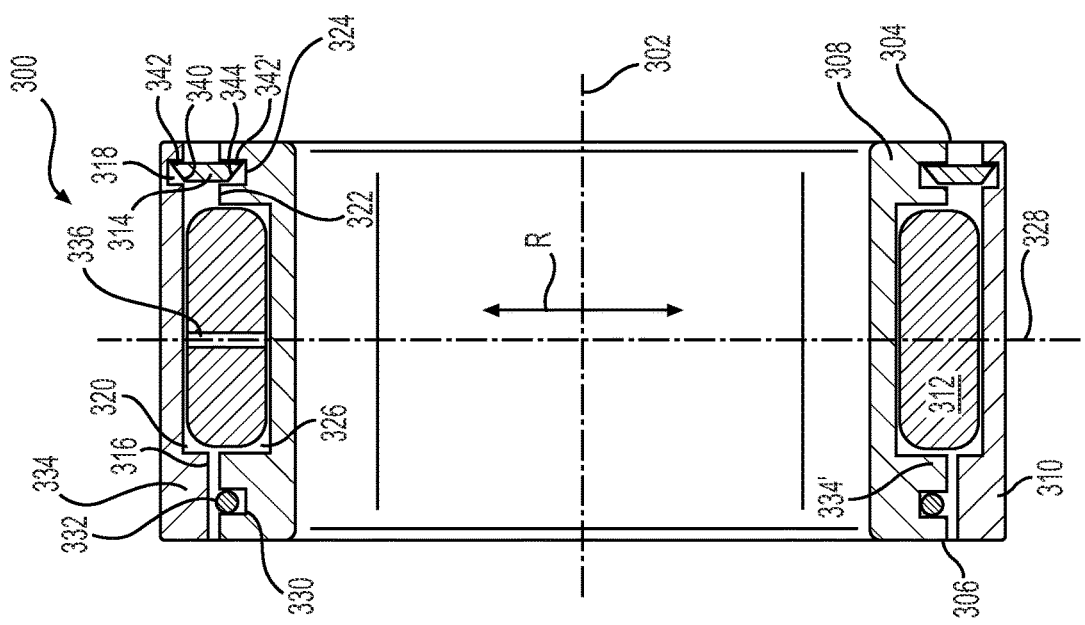
FIG. 6 is a sectional view of the bearing assembly of FIG. 5 taken along a center plane containing the longitudinal axis of the bearing assembly.

Referring to FIGS. 5 and 6, the bearing assembly 300 may further define a first axial end 304 and a second axial end 306. The bearing assembly 300 further comprises an inner radial race 308 (so called as it is positioned radially inwardly) and an outer radial race 310 (so called as it is positioned radially outwardly). A bearing member 312 (e.g. a sleeve bearing) may be disposed radially between the inner radial race 308 and the outer radial race 310. A retaining ring 314 may also be provided that engages the inner radial race 308 and that also engages the outer radial race 310. Hence, the retaining ring 314 may be configured to limit longitudinal/axial movement of the inner radial race 308 relative to the outer radial race 310. This arrangement may make the bearing assembly 300 self-contained, allowing it to be inserted into the third bore 242 (see FIG. 4) in a single step after the bearing assembly 300 has previously been assembled with lubricant sealed within it.

As best seen in FIG. 6, the outer radial race 310 includes an inner radial surface 316 (so called since it is positioned radially inwardly) defining a first notch 318 disposed adjacent the first axial end 304. The first notch 318 may be configured to receive the retaining ring 314 such that the retaining ring 314 is seated in the first notch 318. Also, the inner radial surface 316 may further define a first bearing member receiving slot 320 disposed longitudinally adjacent the first notch 318. The bearing member 312 may be disposed in this slot 320 while also be trapped by the retaining ring 314, limiting the axial movement of the bearing member 312 in both axial directions.

Likewise, the inner radial race 308 may include an outer radial surface 322 (so called since it is positioned radially outwardly) defining a second notch 324 disposed adjacent the first axial end 304. The second notch 324 is also configured to receive the retaining ring 314 such that the retaining ring 314 may be positioned in the second notch 324. The outer radial surface 322 further defines a second bearing member receiving slot 326 disposed longitudinally/ axially adjacent the second notch 324. The bearing member 312 may be disposed in this slot 326 limiting axial movement in both axial directions.

The bearing assembly 300 may define a midplane 328 along the bearing assembly longitudinal axis 302 at the midpoint of the axial length of the bearing assembly 300. The inner radial race 308 may be symmetrical about the midplane 328. Consequently, the inner radial race 308 may further define a third notch 330 disposed adjacent the second axial end 306. An O-ring 332 may be disposed in the third notch 330 to seal lubricant such as grease within the bearing assembly 300. The O-ring may be slid axially past the second axial 306 to fall into the third notch 330 of the inner radial race 308.

More specifically, the outer radial race 310 includes a ridge 334 disposed proximate the second axial end 306 of the bearing assembly 300. The ridge at least partially defines the first bearing member receiving slot 320 and prevents the bearing member 312 from moving axially past the ridge 334 in a first axial direction. The outer radial race 310 lacks another ridge near the first axial end 304, meaning that the outer radial race 310 is configured to slide axially past the O-ring 332 and the bearing member 312 during assembly of the bearing assembly 300. As best seen in FIG. 4, an inner axial ridge 256 of the second track link 226 at least partially defines the third bore 242 and is configured to contact the bearing assembly 300. This arrangement limits movement of the outer radial race 310 along an inward axial direction if the bearing assembly 300 is inserted with the retaining ring 314 toward the bottom of the third bore 242 without needing full support in the bearing assembly 300 itself.

Figure 7:
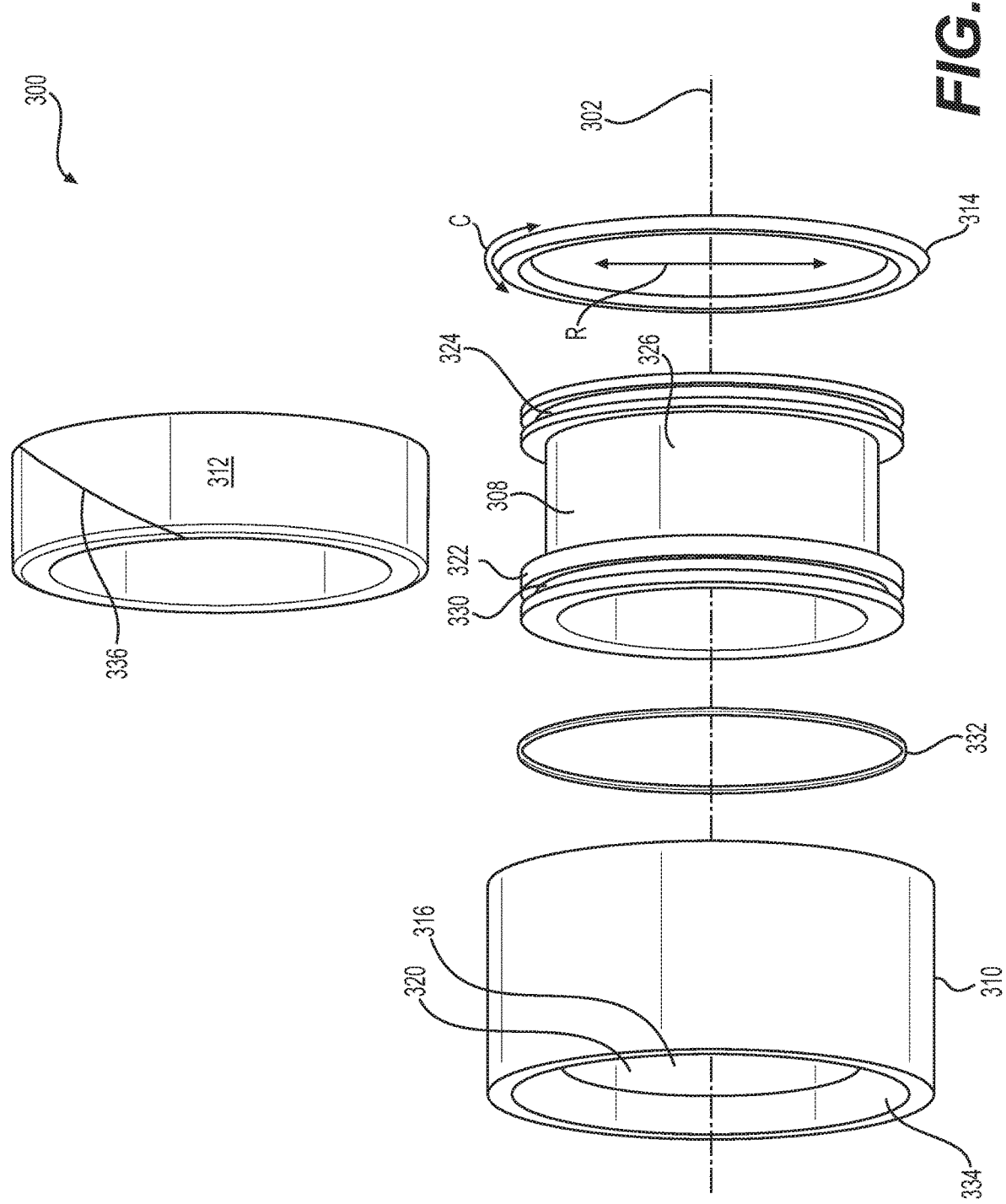
FIG. 7 is an exploded assembly view of the bearing assembly of FIG. 5.

Focusing on FIGS. 6 and 7, the bearing member 312 is slit 336 axially, radially and circumferentially completely through the bearing member 312. As a result, the bearing member 312 is configured to be spread apart and wrapped around the inner radial race 308.

Returning to FIG. 4, the track pin 254 may be disposed in the first bore 218 and the second bore 242 once assembled. More particularly, the track pin 254 includes a first axial end portion 258 that extends through the bearing assembly 300 into the first bore 218. Similarly, a second axial end portion 260 is provided that may be similarly or identically configured to the first axial end portion 258. The track pin 254 may also include an intermediate axial portion 262 disposed between the first axial end portion 258 and the second axial end portion 260. The first axial end portion 258 defines a first end diameter 264, the second axial end portion 260 defines a second end diameter 266, and the intermediate axial portion 262 defines an intermediate diameter 268 that is greater than both the first end diameter 264, and the second end diameter 266. This may not be the case in other embodiments.

So, the intermediate axial portion 262 may serve the function of a track bushing. Combining the track pin and the track bushing into a single component may reduce costs and may provide for a more robust design. Also, since the lubricant is sealed into the bearing assembly 300, lubricant supply passages may not be needed in the track pin 254. The lack of such voids provides more material, allowing the track pin to have more structural strength and to be hardened to a greater depth in all areas. This may make the track pin 254 more robust.

As the track chain assembly 200 is assembled, the first axial end portion 258 may be press fit into the second bore 222. At about the same time or just prior, the first axial end portion 258 may be press fit into the bearing assembly 300.

Prior to that, the bearing assembly 300 may be press fit into the third bore 242. The assembling of the bearing assembly 300 may be accomplished first so that the bearing assembly 300 is inserted into the third bore 242 as a self-contained unit or may be inserted and assembled simultaneously as implied by FIG. 3. In either case, the method of assembling the bearing assembly 300 that will be explained in further detail later herein would still be accurate.

In some embodiments, a bearing assembly 300 may be provided assembled or disassembled as a kit or a self-contained unit as a replacement part/assembly. Looking at FIGS. 5 thru 7, such a bearing assembly 300 may comprise a cylindrical configuration with a radial direction R, a circumferential direction C and defining a bearing assembly longitudinal axis 302, a first axial end 304, and a second axial end 306. An in inner radial race 308, an outer radial race 310, and a bearing member 312 may also be provided. The bearing member 312 may be disposed radially between the inner radial race 308 and the outer radial race 310 once assembled. A retaining ring 314 configured to engage the inner radial race 308 and the outer radial race 310 may also be provided. The retaining ring 314 may be configured to limit longitudinal movement of the inner radial race 308 relative to the outer radial race 310.

The outer radial race 310 may include an inner radial surface 316 defining a first notch 318 disposed adjacent the first axial end 304. Also, the first notch 318 may be configured to receive the retaining ring 314. The inner radial surface 316 may also define a first bearing member receiving slot 320 disposed axially adjacent the first notch 318.

Similarly, the inner radial race 308 may include an outer radial surface 322 defining a second notch 324 disposed adjacent the first axial end 304. The second notch 324 may be configured to receive the retaining ring 314. The outer radial surface 322 may further define a second bearing member receiving slot 326 disposed axially adjacent the second notch 324.

Once assembled, the bearing assembly 300 may define a midplane 328 along the bearing assembly longitudinal axis 302. The inner radial race 308 may be symmetrical about the midplane 328. The assembly 300 further comprising an O-ring 332 configured to be disposed in the third notch 330.

The outer radial race 310 includes a ridge 334 disposed proximate the second axial end 306 of the bearing assembly 300. The ridge 334 may at least partially define the first bearing member receiving slot 320 on only one side. That is to say, the slot 320 extends completely to the first axial end 304. Thus, the outer radial race 310 may be configured to slide axially past the O-ring 332 and the bearing member 312 during assembling process.

As alluded to earlier herein, the bearing member 312 may be slit 336 axially, radially and circumferentially completely through the bearing member 312. The bearing member 312 may be configured to be wrapped around the inner radial race 308. In other embodiments, this slit 336 may not be necessary when the inner and outer radial races 308, 310 are similarly configured with ridges 334, 334' that limit movement of the bearing member 312 only in one axial direction. That is to say, the first and second bearing member receiving slots 320, 326 may both extend completely to the first axial end 304 so that the bearing member 312 may be inserted from the first axial end 304. In such a case, the bearing assembly 300 may rely on the inner axial ridge 256 of the second track link 226 to provide extra axial support in the other axial direction in addition to the retaining ring 314.

Focusing on FIG. 6, the retaining ring 314 includes a first lead-in 340 (e.g. a chamfer, a radius, etc.) that is configured to allow the outer radial race 310 to slide axially past the retaining ring 314 until the retaining ring 314 falls into the first notch 318. When the outer radial race 310 first contacts the retaining ring 314, the retaining ring 314 may deform or bend back to allow the sliding axial movement to continue. The deformation may be elastic such that when the first notch 318 reaches the retaining ring 314, the retaining ring 314 falls into the first notch 314. Since the first lead-in 340 is only on one axial side of the retaining ring 314 near the top of the retaining ring 314, a catch point 342 (e.g. a sharp corner) is formed that helps to prevent disassembly in the opposite axial direction.

Prior to this sliding movement in some embodiments, a second lead-in 344 that is configured to allow the retaining ring 314 to slide axially past the first end 304 of the inner radial race 308 and fall into the second notch 324 may be provided. Both the first and the second lead-in 342, 344 may be on the same axial side of the retaining ring 314 and a similar catch point 342', disposed on the bottom of the retaining ring 314, may be provided to help prevent disassembly of the retaining ring 314 from the inner radial race 308 in the opposite axial direction. It is contemplated that in some embodiments, the retaining ring may be insert molded onto the inner radial race, the outer radial race, or both. In such a case, one or both of the lead-ins may be omitted, etc.

Various features of the inner radial race may be exchanged or shared with the outer radial race and vice versa in other embodiments of the present disclosure.

The various components of the track chain assembly 200 and bearing assembly may be manufactured using any suitable manufacturing process or material. The track links may be forged, cast, or machined using steel, cast iron, steel-cast iron, etc. The races and bearing member may be forged, cast or machined from any suitable metal including steel. The bearing member may have some coating applied to it such as nitride. Various surfaces of the bearing member may be coated or uncoated. The O-ring may be made from rubber, etc. The retaining ring may be made from a plastic such as nylon, polyurethane, etc. Chemical compatibility with the lubricant such as oil or grease may be taken into account when selecting the materials of the components.

INDUSTRIAL APPLICABILITY

In practice, a track chain assembly, and/or a bearing assembly according to any embodiment described herein may be sold, bought, manufactured or otherwise obtained in an OEM or after-market context.

Figure 8:
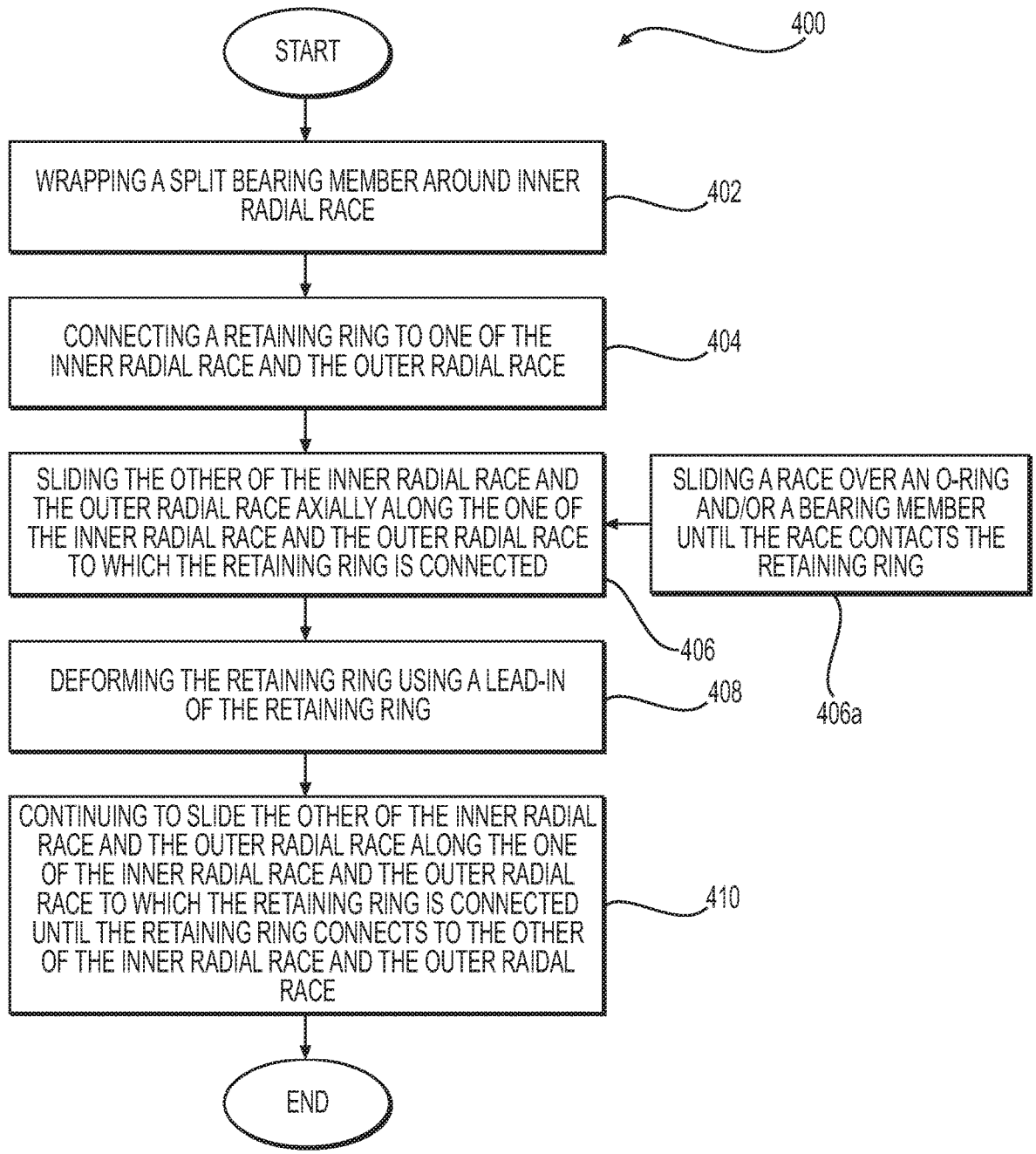
FIG. 8 is a flowchart showing a method of assembling a bearing assembly according to an embodiment of the present disclosure.

FIG. 8 contains a method for assembling a bearing assembly according to an embodiment of the present disclosure. The method 400 may comprise wrapping a split bearing member around inner radial race, (step 402) and connecting a retaining ring to one of the inner radial race and the outer radial race (step 404). This step 404 may be accomplished in a variety of ways including insert injection molding or sliding (e.g. axially) the retaining ring onto the race as previously mentioned herein, etc. Step 402 may be substituted in some embodiments by sliding (e.g. axially) a bearing member that is not necessarily slit onto a race member as previously alluded to earlier herein.

The method 400 may further comprise sliding (e.g. axially) the other of the inner radial race and the outer radial race along the one of the inner radial race and the outer radial race to which the retaining ring is connected (step 406). Step 406 may include sliding (e.g. axially) a race over an O-ring and/or a bearing member until the race contacts the retaining ring (step 406a).

Once the race contacts the bearing member, the method 400 may further comprise deforming the retaining ring using a lead-in of the retaining ring (step 408). One or both of the races may also be deformed, perhaps a miniscule amount.

The method 400 may further comprise continuing to slide (e.g. axially) the other of the inner radial race and the outer radial race along the one of the inner radial race and the outer radial race to which the retaining ring is connected until the retaining ring connects to the other of the inner radial race and the outer radial race (step 410).

The method 400 may be accomplished before inserting the bearing assembly 300 into a track link or may be performed at least partially in situ in the bore of the track link, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A bearing assembly comprising:
a cylindrical configuration with a radial direction, a circumferential direction and defining a bearing assembly longitudinal axis, a first axial end, and a second axial end; and including
an inner radial race;
an outer radial race;
a bearing member configured to be disposed radially between the inner radial race and the outer radial race; and
a retaining ring configured to engage the inner radial race and the outer radial race, the retaining ring being configured to limit longitudinal movement of the inner radial race relative to the outer radial race once assembled;
wherein the outer radial race includes an inner radial surface defining a first notch disposed adjacent the first axial end, the first notch being configured to receive the retaining ring, the inner radial surface also defining a first bearing member receiving slot disposed axially adjacent the first notch, and the inner radial race includes an outer radial surface defining a second notch disposed adjacent the first axial end, the second notch being configured to receive the retaining ring, the outer radial surface further defining a second bearing member receiving slot disposed axially adjacent the second notch, the inner radial race defining a third notch and the assembly further comprising an O-ring configured to be disposed in the third notch.

2. The bearing assembly of claim 1 wherein the bearing assembly defines a midplane along the bearing assembly longitudinal axis, and the outer radial race includes a ridge disposed proximate the second axial end of the bearing assembly, the ridge at least partially defining the first bearing member receiving slot, and the outer radial race being configured to slide past the O-ring and the bearing member during assembly.

3. The bearing assembly of claim 2 wherein the bearing member is slit axially, radially and circumferentially completely through the bearing member, the bearing member being configured to be wrapped around the inner radial race.

4. The bearing assembly of claim 3 wherein the retaining ring includes a first lead-in that is facing toward the midplane that is configured to aid the outer radial race to slide past the retaining ring until the retaining ring falls into the first notch and a second lead-in that is facing toward the midplane that is configured to aid the retaining ring to slide past the inner radial race and fall into the second notch.

5. A bearing assembly comprising:
a cylindrical configuration with a radial direction, a circumferential direction and defining a bearing assembly longitudinal axis, a first axial end, and a second axial end; and including
an inner radial race;
an outer radial race;
a bearing member configured to be disposed radially between the inner radial race and the outer radial race; and
a retaining ring configured to engage the inner radial race and the outer radial race, the retaining ring being configured to limit longitudinal movement of the inner radial race relative to the outer radial race once assembled;
wherein the bearing assembly defines a midplane, and the retainer ring includes a lead-in facing axially toward the midplane and defining a minimum radial dimension of the retainer ring, and a catch point that is disposed next to the lead-in and defining a maximum radial dimension of the retainer.

6. The bearing assembly of claim 5 wherein the outer radial race includes an inner radial surface defining a first notch disposed adjacent the first axial end, the first notch being configured to receive the retaining ring, the inner radial surface also defining a first bearing member receiving slot disposed axially adjacent the first notch, and the inner radial race includes an outer radial surface defining a second notch disposed adjacent the first axial end, the second notch being configured to receive the retaining ring, the outer radial surface further defining a second bearing member receiving slot disposed axially adjacent the second notch, the inner radial race defining a third notch and the assembly further comprising an O-ring configured to be disposed in the third notch.

7. The bearing assembly of claim 6 wherein the bearing member is slit axially, radially and circumferentially completely through the bearing member, the bearing member being configured to be wrapped around the inner radial race.

8. The bearing assembly of claim 5, wherein the retainer ring is straight.

9. A bearing assembly comprising:
a cylindrical configuration with a radial direction, a circumferential direction and defining a bearing assembly longitudinal axis, a first axial end, and a second axial end; and including
an inner radial race;
an outer radial race;
a bearing member configured to be disposed radially between the inner radial race and the outer radial race; and
a retaining ring configured to engage the inner radial race and the outer radial race, the retaining ring being configured to limit longitudinal movement of the inner radial race relative to the outer radial race once assembled;
wherein the bearing assembly defines a midplane, and the retainer ring includes a lead-in facing axially toward the midplane, and the outer radial race includes an inner radial surface defining a first notch disposed adjacent the first axial end, the first notch being configured to receive the retaining ring, the inner radial surface also defining a first bearing member receiving slot disposed axially adjacent the first notch, and the inner radial race includes an outer radial surface defining a second notch disposed adjacent the first axial end, the second notch being configured to receive the retaining ring, the outer radial surface further defining a second bearing member receiving slot disposed axially adjacent the second notch, the inner radial race defining a third notch and the assembly further comprising an O-ring configured to be disposed in the third notch.

* * * * *